United States Patent
Perreira et al.

(10) Patent No.: US 9,954,949 B2
(45) Date of Patent: Apr. 24, 2018

(54) CLOUD IMAGES

(71) Applicant: Hewlett-Packard Development Company, L.P., Houston, TX (US)

(72) Inventors: Mark Perreira, Sunnyvale, CA (US); Jayashree Sundarachar Beltur, Sunnyvale, CA (US); Haris Rasheed Farooqui, Sunnyvale, CA (US); Vijay Misra, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 14/701,433

(22) Filed: Apr. 30, 2015

(65) Prior Publication Data

US 2016/0323382 A1 Nov. 3, 2016

(51) Int. Cl.
*G06F 15/16* (2006.01)
*H04L 29/08* (2006.01)
*H04L 12/24* (2006.01)

(52) U.S. Cl.
CPC ...... *H04L 67/1097* (2013.01); *H04L 41/0806* (2013.01); *H04L 41/5041* (2013.01); *H04L 67/325* (2013.01); *H04L 41/5096* (2013.01)

(58) Field of Classification Search
USPC ........................................................ 709/217
See application file for complete search history.

(56) References Cited

U.S. PATENT DOCUMENTS

| 6,986,134 B1* | 1/2006 | Foster ....................... G06F 8/61 717/177 |
| 8,468,455 B2* | 6/2013 | Jorgensen ............. G06F 9/4445 707/610 |
| 8,521,861 B2* | 8/2013 | Bavishi ............... H04L 41/0668 707/756 |
| 8,543,680 B2* | 9/2013 | Bavishi ............... H04L 41/0668 707/756 |
| 8,793,684 B2 | 7/2014 | Breitgand et al. |
| 8,799,453 B2* | 8/2014 | Cahill ................... G06F 9/5072 709/224 |

(Continued)

OTHER PUBLICATIONS

"MCollective >> Deploy >> Installing Plugins," May 16, 2013, pp. 1-5. Puppet Labs, Available at: <docs.puppetlabs.com/mcollective/deploy/plugins.html>.

(Continued)

*Primary Examiner* — Alicia Baturay
(74) *Attorney, Agent, or Firm* — Mannava & Kang, P.C.

(57) ABSTRACT

Examples disclosed herein relate to cloud images. The examples enable generating a first cloud image to configure a first node to serve a first role in a cloud infrastructure. The first cloud image comprising a first set of packages may be stored in a first local repository of the first cloud image. The examples further enable generating a second cloud image to configure a second node to serve a second role in the cloud infrastructure where the second cloud image comprises a second set of packages stored in a second local repository of the second cloud image. The examples further enable causing the first cloud image to be deployed to the first node in the cloud infrastructure and causing the second cloud image to be deployed to the second node in the cloud infrastructure.

20 Claims, 5 Drawing Sheets

(56) References Cited

U.S. PATENT DOCUMENTS

| | | | |
|---|---|---|---|
| 8,850,261 B2* | 9/2014 | Blood | G06F 9/06 |
| | | | 714/4.1 |
| 8,954,568 B2* | 2/2015 | Krishnan | G06F 9/505 |
| | | | 709/203 |
| 9,015,177 B2* | 4/2015 | Cahill | G06F 17/30575 |
| | | | 707/756 |
| 9,311,199 B2* | 4/2016 | Blood | G06F 9/06 |
| 9,448,780 B1* | 9/2016 | Hall | G06F 8/61 |
| 2011/0093847 A1* | 4/2011 | Shah | G06F 9/45558 |
| | | | 718/1 |
| 2013/0201349 A1* | 8/2013 | Balle-Pedersen | H04N 5/77 |
| | | | 348/207.1 |
| 2013/0218618 A1* | 8/2013 | Purcell | G06F 9/5072 |
| | | | 705/7.13 |
| 2014/0196022 A1 | 7/2014 | Skutin et al. | |
| 2015/0253946 A1* | 9/2015 | Chandrasekaran | G06F 3/0484 |
| | | | 715/748 |

OTHER PUBLICATIONS

"Snf-deploy tool," Sep. 10, 2014, pp. 1-8, Available at: <synnefo.org/docs/synnefo/0.15/snf-deploy.html>.

Glynn Foster, "How to Set Up a Repository Mirroring Service with the Oracle Solaris 11 Image Packaging Service," Aug. 2014, pp. 1-5, Oracle.

Matt Wrock, "Automate the Install and Setup of a Team Foundation 2013 Server with Build Services on a Azure VM with Boxstarter," Jan. 26, 2014, pp. 1-33, Boxstarter.

* cited by examiner

CLOUD IMAGES

BACKGROUND

Computing infrastructure service providers such as cloud service providers offer Internet-based computing where shared resources are provided to users as a service. Cloud computing, for example, enables provisioning of dynamically scalable and often virtualized resources on demand.

BRIEF DESCRIPTION OF THE DRAWINGS

The following detailed description references the drawings, wherein.

DETAILED DESCRIPTION

Figure 1:
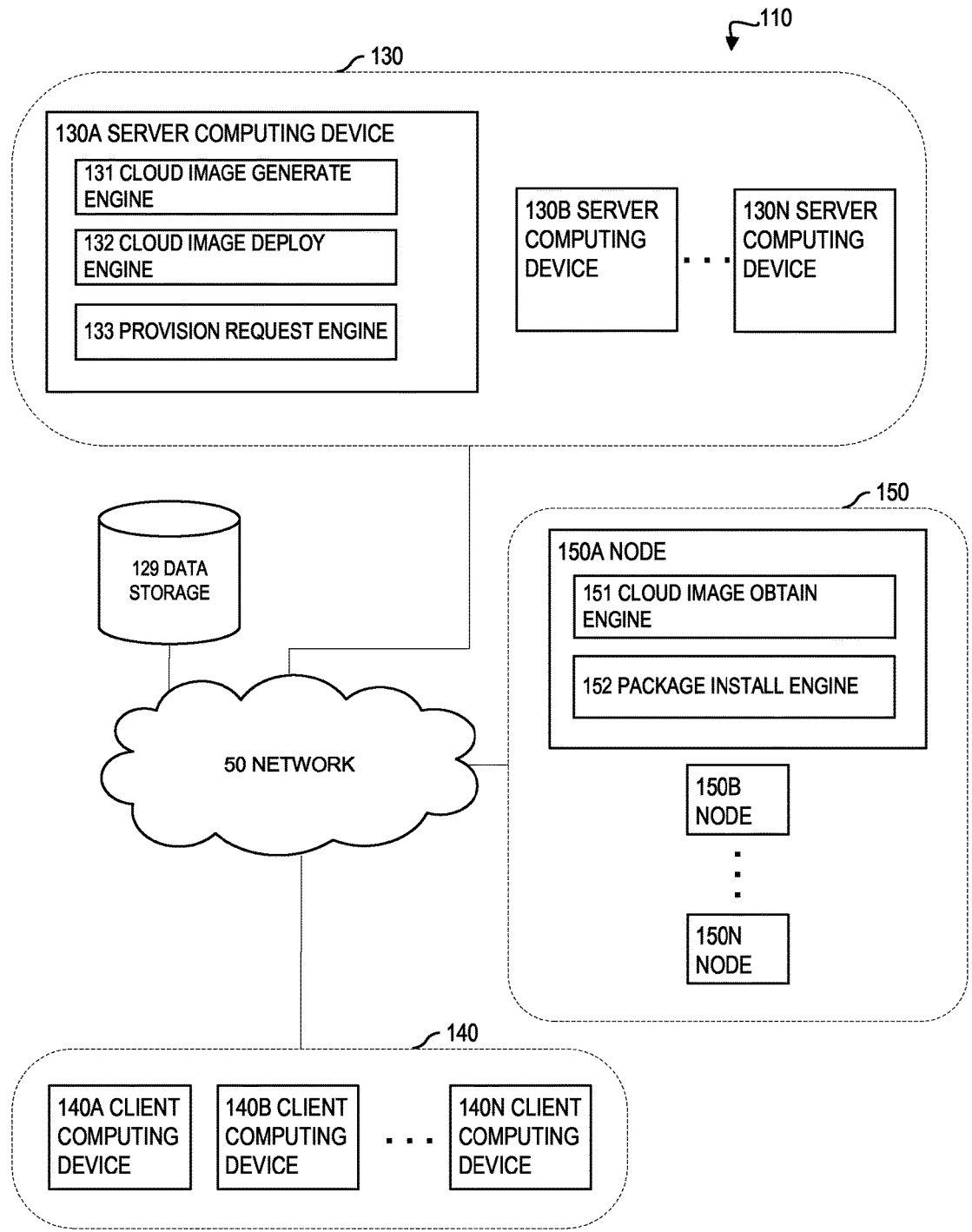
FIG. 1 is a block diagram depicting an example system comprising various components including a server computing device, a client computing device, and a node in a cloud infrastructure.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

Computing infrastructure service providers such as cloud service providers offer network-based computing where shared resources are provided to users as a service. Cloud computing, for example, enables provisioning of dynamically scalable and often virtualized resources on demand. A "cloud infrastructure," as used herein, may describe various cloud components (e.g., nodes, services, networks, software applications, etc.) and their relationships in a cloud environment. As such, the cloud infrastructure, when successfully deployed, may set up the various cloud components according to the infrastructure in the cloud environment. The shared resources may be provisioned on demand from the cloud environment having the cloud infrastructure.

To deploy a particular cloud infrastructure, various cloud components may be configured according to the particular cloud infrastructure. For example, a set of packages that can be used to configure a cloud component (e.g., a node) may be stored in a central repository that may be accessible by a plurality of nodes. When a cloud infrastructure with a large number of cloud components is being deployed, it tends to overwhelm the central repository in serving packages to potentially hundreds of nodes. The central repository may not have sufficient network bandwidth to serve the needs and may even have disk throughput issues to access the desired packages.

Examples disclosed herein provide technical solutions to these technical challenges by generating a cloud image that stores a set of packages in a local repository of the cloud image itself. The examples enable generating a first cloud image to configure a first node to serve a first role in a cloud infrastructure. The first cloud image comprising a first set of packages may be stored in a first local repository of the first cloud image. The examples further enable generating a second cloud image to configure a second node to serve a second role in the cloud infrastructure where the second cloud image comprises a second set of packages stored in a second local repository of the second cloud image. The examples further enable causing the first cloud image to be deployed to the first node in the cloud infrastructure where at least a portion of the first set of packages is installed on the first node. The examples further enable causing the second cloud image to be deployed to the second node in the cloud infrastructure where at least a portion of the second set of packages is installed on the second node.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is a block diagram depicting an example system 110 comprising various components including a server computing device, a client computing device, and a node in a cloud infrastructure.

The various components may include client computing devices 140 (illustrated as 140A, 140B, . . . , 140N) and server computing devices 130 (illustrated as server computing device 130A, 130B, . . . , 130N). Each client computing device 140A, 140B, . . . , 140N may communicate requests to and/or receive responses from server computing device 130. Server computing device 130 may receive and/or respond to requests from client computing devices 140. Client computing devices 140 may include any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components may include a cloud infrastructure comprising a plurality of nodes 150 (illustrated as 150A, 150B, . . . , 150N). A "cloud infrastructure," as used herein, may comprise various cloud components including, for example, the plurality of nodes 150, services, networks, and/or software programs. A node may represent a physical or virtual node.

The various components (e.g., components 129, 130, 140, and/or 150) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 110 and the various components described herein may be implemented in hardware and/or programming that configures hardware. Furthermore, in FIG. 1 and other Figures described herein, different numbers of components or entities than depicted may be used.

Server computing device 130 may comprise a cloud image generate engine 131, a cloud image deploy engine 132, a provision request engine 133, and/or other engines. The term "engine", as used herein, refers to a combination of hardware and programming that performs a designated function. As is illustrated respect to FIGS. 3-4, the hardware of each engine, for example, may include one or both of a processor and a machine-readable storage medium, while the programming is instructions or code stored on the machine-readable storage medium and executable by the processor to perform the designated function.

Cloud image generate engine 131 may generate a cloud image to configure a node to serve a particular role in a cloud infrastructure. A "cloud infrastructure," as used herein, may comprise various cloud components including, for example, a plurality of nodes (e.g., the plurality of nodes 150), services, networks, and/or software programs. A node may represent a physical or virtual node. As used herein, a "role" that a particular node serves in the cloud infrastructure may refer to a particular type of node. The type of node may comprise an indication of whether the node is a compute node, a storage node, a control node, etc. (e.g., which services running on the node), and/or other attributes of the node such as attributes related to the node's disk, memory, processor, and/or network.

A "cloud image," as used herein, may comprise a snapshot image of an operating system (OS) and data, scripts, and/or tools that have been placed in the OS at the time the snapshot image of the OS is created. Any snapshot techniques known in the art may be used to create the snapshot image. A cloud image may be re-used (e.g., deployed an infinite number of times). The cloud image, when used to "image" a particular node in a cloud infrastructure, may install the same OS (e.g., with the data, scripts, and/or tools that have been placed in the OS at the time the snapshot of the OS is created) in the particular node. In some implementations, the cloud image may include a set of packages stored in a local repository of the cloud image. The set of packages may comprise configuration data (e.g., that may configure the node to serve a particular role in the cloud infrastructure) and/or an installer that installs at least a portion of the configuration data on the node.

Note that the set of packages is not pre-installed in the cloud image. In other words, the set of packages may be stored in the local repository of the cloud image in an un-installed state. In this way, the size of the cloud image may be kept relatively small compared to what the size of the cloud image would be if the set of packages were pre-installed in the cloud image. Further, if an additional package needs to be installed on the node, the node does not need to be re-imaged with a new cloud image with the additional package pre-installed. Instead, the additional package can be separately installed on the node without having to re-image the node. Having the set of packages stored in the local repository of the cloud image in the un-installed state may be particularly advantageous when the node has been already provisioned. For example, if an additional package needs to be installed on the provisioned node that has been imaged with pre-installed packages, the provisioned node needs to be re-imaged with a new cloud image with the additional package pre-installed, meaning that any data on the provisioned node can be lost after the node is re-imaged.

In some implementations, a plurality of cloud images may be generated such that each of the plurality of cloud images has a particular set of packages that is unique to (e.g., associated with) a particular role (and/or a particular type of node). In other words, each cloud image may be unique to a particular role (and/or a particular type of node). For example, cloud image generate engine 131 may generate a first cloud image to configure a first node to serve a first role in a cloud infrastructure where the first cloud image may comprise a first set of packages stored in a first local repository of the first cloud image. Similarly, cloud image generate engine 131 may generate a second cloud image to configure a second node to serve a second role in the cloud infrastructure where the second cloud image may comprise a second set of packages stored in a second local repository of the second cloud image.

In other implementations, a cloud image may comprise a plurality of sets of packages where each set of packages is associated with a different role (and/or a different type of node). In other words, this type of cloud image may be associated with more than one role (and/or more than one type of node). Returning to the example above, a third cloud image may be generated that comprises the first set of packages (e.g., unique to the first role) and the second set of packages (e.g. unique to the second role). As such, the third cloud image may be deployed to two (or more) nodes and/or may be used to configure one node with the first set of packages and configure the other node with the second set of packages. Further, the third cloud image may enable the same node to switch between different roles. For example, a node that was configured with the first set of packages may be re-configured with the second set of packages to switch from the first role to the second role.

Cloud image deploy engine 132 may cause a cloud image (e.g., generated by cloud image generate engine 131) to be deployed to a node (and/or a plurality of nodes) in the cloud infrastructure. In doing so, a copy of the cloud image may be transmitted to the node or otherwise be made accessible by the node. For example, a copy of the cloud image may be physically downloaded into and/or saved in the node. In another example, a copy of the cloud image may be made available in a remote repository from which the node may download the copy. As discussed below with respect to cloud image obtain engine 151, the node (e.g., node 150A) may obtain this cloud image that was deployed by cloud image deploy engine 132. As discussed below with respect to package install engine 152, the cloud image obtained by cloud image deploy engine 132 or at least a portion of the set of packages (e.g., stored in the local repository of the cloud image) may be installed on the node (e.g., 150A).

Provision request engine 133 may obtain a request to provision a computing resource related to a particular role (and/or a particular type of node). "Provisioning" a computing resource from a cloud infrastructure service provider may refer to assigning the computing resource to a particular user for the user's consumption. For example, a user (e.g., an individual, an organization, and/or other entity) may create a request to provision a computing resource. The request to provision may comprise a user identifier that uniquely identifies the user requesting the computing resource, a resource requirement (e.g., that may describe a particular role that the requested computing resource should serve in the cloud infrastructure and/or a particular type of node or computing resource that the user wishes to provision), a timing requirement, and/or other requirements for the computing resource.

In some implementations, the request to provision may be system-generated and/or generated based on user input. For example, the request may be system-generated based on a resource usage pattern, a budget, a task or project schedule, and/or other information. Most cloud infrastructure providers provide a user portal that the user may access using a client computing device (e.g., client computing device 140A) to create and/or submit the request to provision. For example, the user may access the user portal and specify various requirements including the resource requirement and/or the timing requirement to create and/or submit the request.

The resource requirement may describe a particular role that the requested computing resource should serve in the cloud infrastructure. In other words, the resource requirement may comprise a type of node or computing resources that the user wishes to provision. The user may specify the type by indicating various attributes for a desired computing resource including, but not being limited to, an indication of whether the node is a compute node, a storage node, a control node, etc., disk requirements, memory requirements, processor requirements, network requirements, and/or other suitable requirements. Further, the request may comprise a timing requirement that may specify a start time for the user to use the computing resource. The start time may indicate the time that the user expects to start using the computing resource and/or the time that the user needs the resource to be available for use.

In response to the request to provision, provision request engine 133 may determine whether any nodes in the cloud infrastructure satisfy the request to provision. For example, provision request engine 133 may determine whether a first node (e.g., having a first set of packages installed and/or configured to serve a first role in the cloud infrastructure) satisfies the request to provision, whether a second node (e.g., having a second set of packages installed and/or configured to serve a second role in the cloud infrastructure) satisfies the request to provision, whether a third node (e.g., having a third set of packages installed and/or configured to serve a third role in the cloud infrastructure) satisfies the request to provision, and so on. Assuming that the first node satisfies the request to provision, provision request engine 133 may cause the first node to be provisioned in response to obtaining the request to provision.

As detailed below, a node (e.g., node 150A) may comprise a cloud image obtain engine 151, a package install engine 152, and/or other engines.

Cloud image obtain engine 151 may obtain a cloud image (e.g., that was deployed by cloud image deploy engine 132 as discussed above). The cloud image may be obtained in various ways. For example, a copy of the cloud image may be physically downloaded into and/or saved in the node. In another example, a copy of the cloud image may be made available in a remote repository from which the node may download the copy. The obtained image may be used to "image" the node such that the OS (e.g., with the data, scripts, and/or tools that have been placed in the OS at the time the snapshot image of the OS is created) is installed in the particular node. In some implementations, the cloud image may include a set of packages stored in a local repository of the cloud image. The set of packages may comprise configuration data (e.g., that may configure the node to serve a particular role in the cloud infrastructure) and/or an installer that installs at least a portion of the configuration data on the node.

Package install engine 152 may identify the set of packages in the local repository of the cloud image and/or cause the set of packages (or any portion thereof) to be installed on the node. Package install engine 152 may use an installer stored in the local repository of the cloud image (or in other repository of the cloud image) to install the set of packages (or any portion thereof). In some implementations, package install engine 152 may use an installer external to the cloud image to install the set of packages (or any portion thereof). Package install engine 152 may install a portion of the set of packages at first and/or install a different portion of the set of packages from the local repository at a later time. In some instances, an additional package may be downloaded or otherwise identified by package install engine 152. Package install engine 152 may install the additional package on the node.

In performing their respective functions, engines 131-133 and/or engines 151-152 may access data storage 129 and/or other suitable database(s). Data storage 129 and/or other database may represent any memory accessible to system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. System 110 may access data storage 129 locally or remotely via network 50 or other networks.

Data storage 129 and/or other database may include a database to organize and store data. The database may reside in a single or multiple physical device(s) and in a single or multiple physical location(s). The database may store a plurality of types of data and/or files and associated data or file description, administrative information, or any other data.

Figure 2:
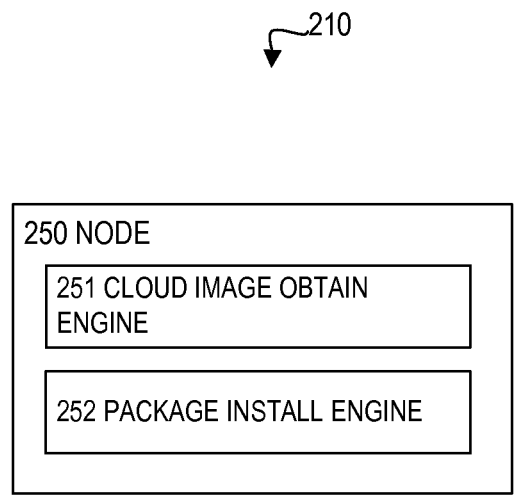
FIG. 2 is a block diagram depicting an example system comprising a node in a cloud infrastructure.

FIG. 2 is a block diagram depicting an example system 210 comprising a node 250 in a cloud infrastructure. Node 250 may comprise a cloud image obtain engine 251, a package install engine 252, and/or other engines. Engines 251-252 represent engines 151-152, respectively.

Figure 3:
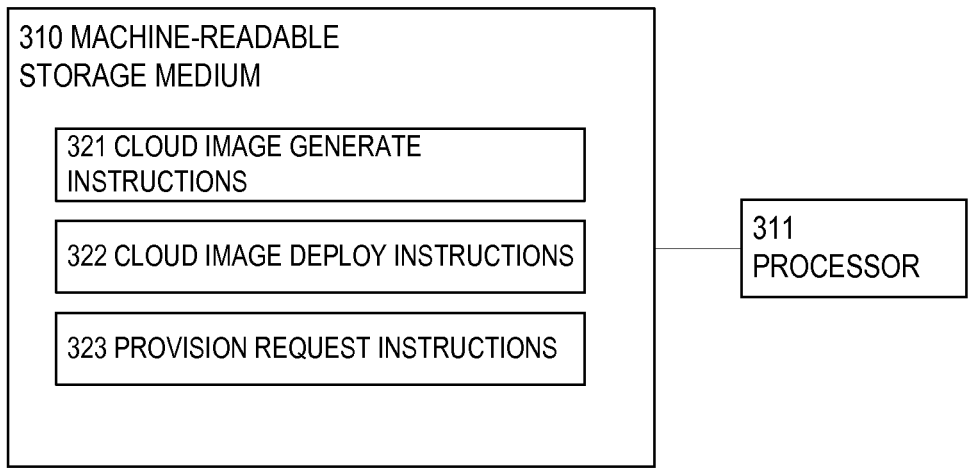
FIG. 3 is a block diagram depicting an example machine-readable storage medium comprising instructions executable by a processor for generating cloud images.

FIG. 3 is a block diagram depicting an example machine-readable storage medium 310 comprising instructions executable by a processor for generating cloud images.

In the foregoing discussion, engines 131-133 were described as combinations of hardware and programming. Engines 131-133 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements engines 131-133 of FIG. 1.

In FIG. 3, the executable program instructions in machine-readable storage medium 310 are depicted as cloud image generate instructions 321, cloud image deploy instructions 322, and provision request instructions 323. Instructions 321-323 represent program instructions that, when executed, cause processor 311 to implement engines 131-133, respectively.

Figure 4:
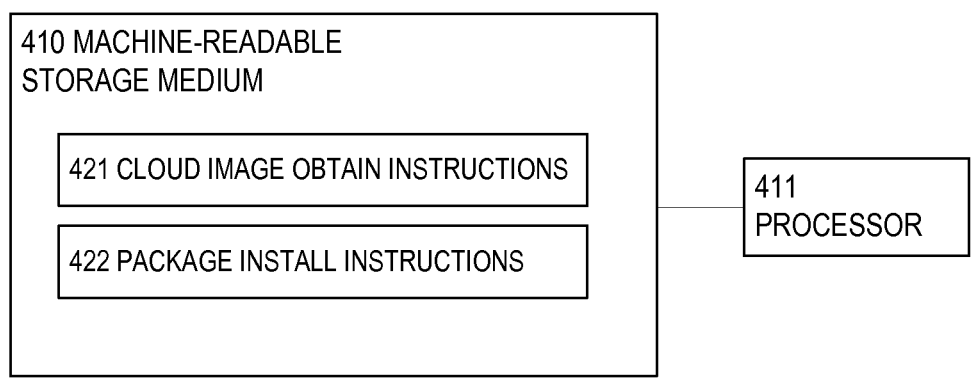
FIG. 4 is a block diagram depicting an example machine-readable storage medium comprising instructions executable by a processor for obtaining cloud images.

FIG. 4 is a block diagram depicting an example machine-readable storage medium 410 comprising instructions executable by a processor for obtaining cloud images.

In the foregoing discussion, engines 151-152 were described as combinations of hardware and programming. Engines 151-152 may be implemented in a number of fashions. Referring to FIG. 4, the programming may be processor executable instructions 421-422 stored on a machine-readable storage medium 410 and the hardware may include a processor 411 for executing those instructions. Thus, machine-readable storage medium 410 can be said to store program instructions or code that when executed by processor 411 implements engines 151-152 of FIG. 1.

In FIG. 4, the executable program instructions in machine-readable storage medium 410 are depicted as cloud image obtain instructions 421 and package install instructions 422. Instructions 421-422 represent program instructions that, when executed, cause processor 411 to implement engines 151-152, respectively.

Machine-readable storage medium 310 (or machine-readable storage medium 410) may be any electronic, magnetic, optical, or other physical storage device that contains or stores executable instructions. In some implementations, machine-readable storage medium 310 (or machine-readable storage medium 410) may be a non-transitory storage medium, where the term "non-transitory" does not encompass transitory propagating signals. Machine-readable storage medium 310 (or machine-readable storage medium 410) may be implemented in a single device or distributed across devices. Likewise, processor 311 (or processor 411) may represent any number of processors capable of executing instructions stored by machine-readable storage medium 310 (or machine-readable storage medium 410). Processor 311 (or processor 411) may be integrated in a single device or distributed across devices. Further, machine-readable storage medium 310 (or machine-readable storage medium 410) may be fully or partially integrated in the same device as processor 311 (or processor 411), or it may be separate but accessible to that device and processor 311 (or processor 411).

In one example, the program instructions may be part of an installation package that when installed can be executed by processor 311 (or processor 411) to implement system 110. In this case, machine-readable storage medium 310 (or machine-readable storage medium 410) may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 (or machine-readable storage medium 410) may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Processor 411 may be at least one central processing unit (CPU), microprocessor, and/or other hardware device suitable for retrieval and execution of instructions stored in machine-readable storage medium 410. Processor 411 may fetch, decode, and execute program instructions 421-422, and/or other instructions. As an alternative or in addition to retrieving and executing instructions, processor 411 may include at least one electronic circuit comprising a number of electronic components for performing the functionality of at least one of instructions 421-422, and/or other instructions.

Figure 5:
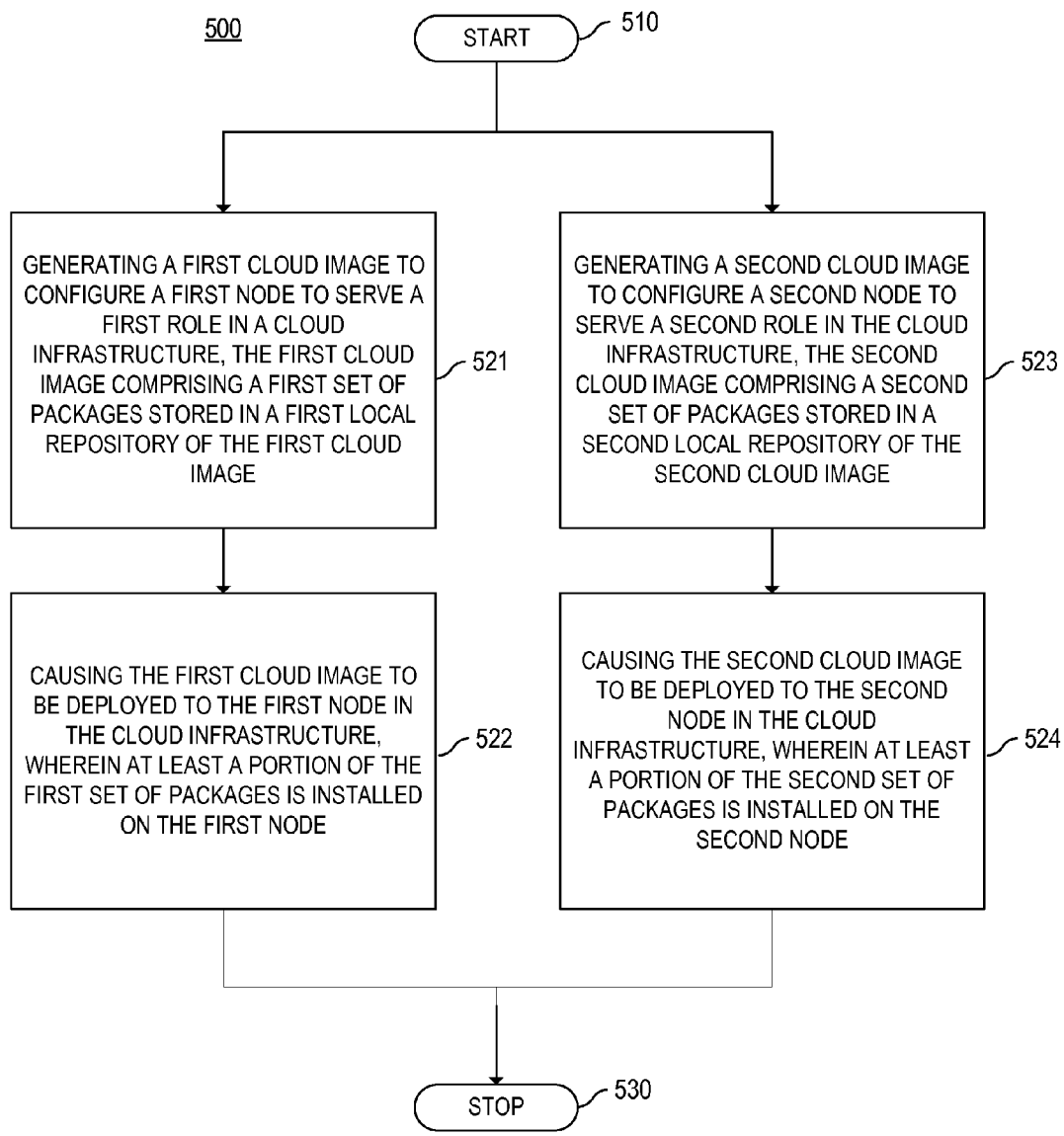
FIG. 5 is a flow diagram depicting an example method for generating cloud images.

FIG. 5 is a flow diagram depicting an example method 500 for generating cloud images. The various processing blocks and/or data flows depicted in FIG. 5 (and in the other drawing figures such as FIG. 6) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

Method 500 may start in block 510 and proceed to block 521 and/or block 523. In block 521, method 500 may include generating a first cloud image to configure a first node to serve a first role in a cloud infrastructure. The first cloud image may comprise a first set of packages stored in a first local repository of the first cloud image. Referring back to FIG. 1, cloud image generate engine 131 may be responsible for implementing block 521.

In block 522, method 500 may include causing the first cloud image to be deployed to the first node in the cloud infrastructure, wherein at least a portion of the first set of packages is installed on the first node. Referring back to FIG. 1, cloud image deploy engine 132 may be responsible for implementing block 522.

In block 523, method 500 may include generating a second cloud image to configure a second node to serve a second role in the cloud infrastructure. The second cloud image may comprise a second set of packages stored in a second local repository of the second cloud image. Referring back to FIG. 1, cloud image generate engine 131 may be responsible for implementing block 523.

In block 524, method 500 may include causing the second cloud image to be deployed to the second node in the cloud infrastructure, wherein at least a portion of the second set of packages is installed on the second node. Referring back to FIG. 1, cloud image deploy engine 132 may be responsible for implementing block 524. Method 500 may stop in block 530.

Figure 6:
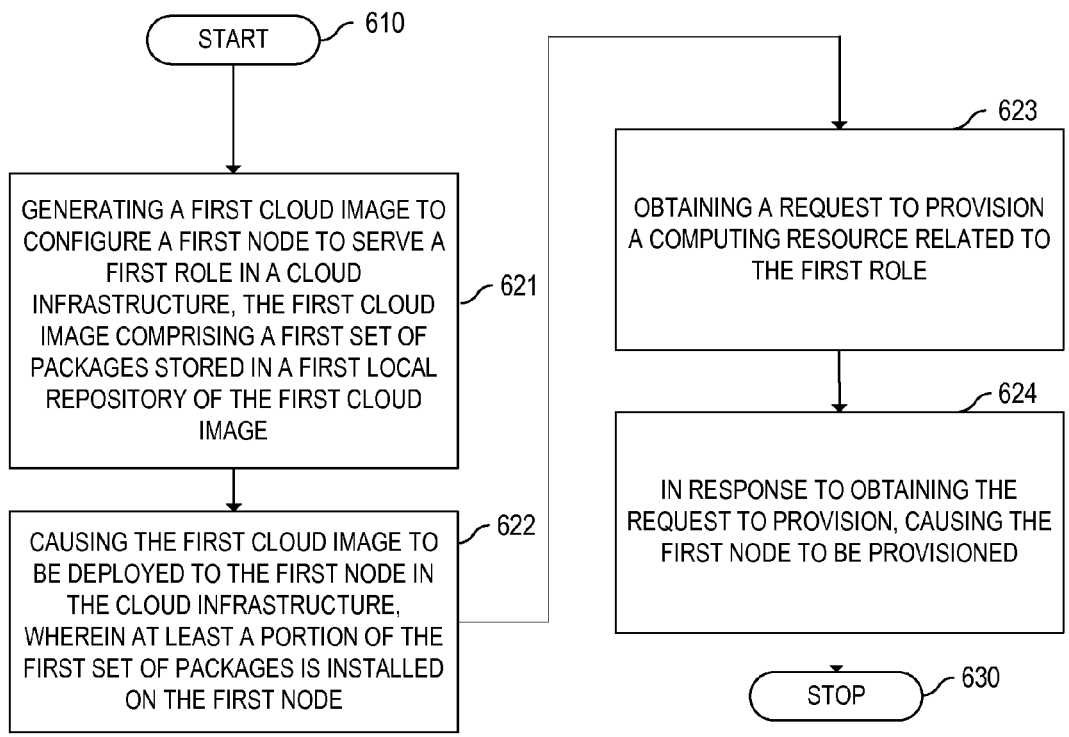
FIG. 6 is a flow diagram depicting an example method for generating cloud images.

FIG. 6 is a flow diagram depicting an example method 600 for generating cloud images. Method 600 as illustrated (and described in greater detail below) is meant be an example and, as such, should not be viewed as limiting. Method 600 may be implemented in the form of executable instructions stored on a machine-readable storage medium, such as storage medium 310, and/or in the form of electronic circuitry.

Method 600 may start in block 610 and proceed to block 621. In block 621, method 600 may include generating a first cloud image to configure a first node to serve a first role in a cloud infrastructure. The first cloud image may comprise a first set of packages stored in a first local repository of the first cloud image. Referring back to FIG. 1, cloud image generate engine 131 may be responsible for implementing block 621.

In block 622, method 600 may include causing the first cloud image to be deployed to the first node in the cloud infrastructure, wherein at least a portion of the first set of packages is installed on the first node. Referring back to FIG. 1, cloud image deploy engine 132 may be responsible for implementing block 622.

In block 623, method 600 may include obtaining a request to provision a computing resource related to the first role. Referring back to FIG. 1, provision request engine 133 may be responsible for implementing block 623. Method 600 may stop in block 630.

In block 624, method 600 may include causing the first node to be provisioned in response to obtaining the request to provision the computing resource related to the first role. Referring back to FIG. 1, provision request engine 133 may be responsible for implementing block 624. Method 600 may stop in block 630.

The foregoing disclosure describes a number of example implementations for cloud images. The disclosed examples may include systems, devices, computer-readable storage media, and methods for cloud images. For purposes of explanation, certain examples are described with reference to the components illustrated in FIGS. 1-4. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 5-6 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for generating cloud images, the method comprising:
   generating a cloud image comprising a local repository on which is stored a first set of packages and a second set of packages, wherein the first set of packages corresponds to a first node role in a cloud and the second set of packages corresponds to a second node role in the cloud, the second node role differing from the first node role; and
   configuring a node in the cloud to have the first node role by:
      deploying the generated cloud image having the local repository to the node; and
      instructing the node to install the first set of packages from the local repository of the generated cloud image without installing the second set of packages.

2. The method of claim 1, further comprising:
   configuring a second node in the cloud to have the second node role by:
   deploying the generated cloud image having the local repository to the second node; and
   instructing the second node to install the second set of packages from the local repository of the generated cloud image without installing the first set of packages.

3. The method of claim 1, wherein the first set of packages is not pre-installed in the cloud image and the second set of packages is not pre-installed in the cloud image.

4. The method of claim 1, wherein the first set of packages comprises configuration data to configure the node to serve the first node role.

5. The method of claim 4, wherein the first set of packages comprises an installer that identifies at least a portion of the configuration data in the local repository and installs at least the portion of the configuration data on the node.

6. The method of claim 1, wherein the second set of packages comprises configuration data to configure the node to serve the second node role.

7. The method of claim 1, wherein the first or second node role comprises at least one of: a role as a compute node, a role as a storage node, and a role as a control node.

8. The method of claim 1, further comprising:
   obtaining a request to provision a computing resource related to the first node role; and
   in response to obtaining the request to provision, causing the node to be provisioned.

9. The method of claim 1, further comprising:
   obtaining a request to provision a computing resource related to the second node role; and
   in response to obtaining the request to provision, causing the node to be provisioned.

10. A non-transitory machine-readable storage medium comprising instructions executable by a processor of a computing device for generating cloud images, wherein execution of the instructions are to cause the processor to:
   generate a cloud image comprising a local repository on which is stored a set of packages, a first portion of the set of packages being associated with a first type of node and a second portion of the set of packages being associated with a second type of node;
   cause the cloud image with the local repository to be deployed to a node in a cloud infrastructure, wherein the first portion of the set of packages is to configure the node to serve as the first type of node in the cloud infrastructure;
   obtain a first request to provision a computing resource related to the first type of node; and in response to obtaining the first request to provision, cause the node configured with the first portion of the set of packages to be provisioned.

11. The non-transitory machine-readable storage medium of claim 10, wherein the instructions are further to cause the processor to:
cause the cloud image with the local repository to be deployed to a second node in the cloud infrastructure, wherein the second portion of the set of packages is to configure the second node to serve as the second type of node in the cloud infrastructure;
obtain a second request to provision a computing resource related to the second type of node; and
in response to obtaining the second request to provision, cause the second node configured with the second portion of the set of packages to be provisioned.

12. The non-transitory machine-readable storage medium of claim 11, wherein the set of packages comprises configuration data to configure the node to serve as the first type of node or the second type of node in the cloud infrastructure.

13. The non-transitory machine-readable storage medium of claim 12, wherein the set of packages comprises an installer that identifies at least a portion of the configuration data in the local repository and installs at least the portion of the configuration data in the node.

14. The non-transitory machine-readable storage medium of claim 10, wherein the set of packages is not pre-installed in the cloud image.

15. The non-transitory machine-readable storage medium of claim 10, wherein the first or second type of node comprises at least one of: a compute node, a storage node, and a control node.

16. A system for obtaining cloud images comprising:
a node in a cloud infrastructure, the node comprising a processor and a memory on which is stored machine readable instructions executable by the processor to:
obtain a cloud image to configure the node to serve a particular role in the cloud infrastructure, the cloud image comprising a local repository on which is stored sets of packages, wherein each set of packages corresponds to a different particular role in the cloud infrastructure;
identify a first set of packages of the sets of packages corresponding to the particular role that the node is to serve in the cloud infrastructure; and
cause the identified first set of packages to be installed on the node to cause the node to serve the particular role.

17. The system of claim 16, wherein the particular role comprises at least one of: a role as a compute node, a role as a storage node, and a role as a control node.

18. The system of claim 16, wherein the instructions are further to cause the processor to:
obtain the cloud image that was deployed to the node.

19. The system of claim 16, wherein the sets of packages are not pre-installed in the cloud image.

20. The system of claim 16, wherein the sets of packages comprise configuration data that is used to configure the node to serve the particular role.

\* \* \* \* \*